United States Patent

[11] 3,582,973

[72] Inventor Richard Munro Dorward
Galashiels, Scotland

[21] Appl. No. 780,049
[22] Filed Nov. 29, 1968
[45] Patented June 1, 1971
[73] Assignee The General Electric and English Electric Companies, Limited
London, England
[32] Priority Nov. 29, 1967
[33] Great Britain
[31] 54,326/67

[54] A HIGH-SPEED BISTABLE SWITCHING CIRCUITS
2 Claims, 2 Drawing Figs.

[52] U.S. Cl. .......... 307/221, 307/269, 307/292
[51] Int. Cl. .......... G11c 19/00
[50] Field of Search .......... 307/292, 289, 291, 221

[56] References Cited

UNITED STATES PATENTS

| | | | |
|---|---|---|---|
| 3,174,052 | 3/1965 | Hempel | 307/292 |
| 3,309,540 | 3/1967 | Hubbs | 307/292 |

FOREIGN PATENTS

| | | | |
|---|---|---|---|
| 1,257,840 | 1/1968 | Germany | 307/292 |

*Primary Examiner*—Donald D. Forrer
*Assistant Examiner*—L. N. Anagnos
*Attorney*—Kirschstein, Kirschstein, Ottinger & Frank

ABSTRACT: A two-state transistor circuit particularly for operation at high speeds in which switching pulses are repeatedly steered to one or other of two switching transistors. Repeated 'switching' to the same state, as in a 111111 pulse sequence, tends to build up a charge which delays a change of state when it eventually occurs (1111110). Two diodes connected back to back between the switching pulse electrodes of the transistors limit the charge accumulation and hasten the eventual state change. A resistor connected between the electrodes is an inferior alternative.

INVENTOR
RICHARD MUNRO DORWARD
BY
ATTORNEYS

A HIGH-SPEED BISTABLE SWITCHING CIRCUITS

This invention relates to electric switching circuits in which switching is effected between different states of conduction.

In high-speed switching circuits, such for example as are required in pulse-code modulation (P.C.M.) transmission of basically high frequency intelligence signals, the circuit operating speed is limited by the switching speed of individual circuit elements such as bistable circuits. At the frequencies involved in P.C.M. transmission of, say, television video signals, the switching speed is dependent upon the immediately preceding operating history. For example, in a two-state transistor circuit the charge distribution on the various electrodes will to some extent vary according to the cumulative effect of the preceding periods in the different states. The more rapid the changes of state the more significant will this effect be. It is therefore an object of the present invention to reduce the dependence of a circuit switching speed on its operating history and thereby increase the switching speed.

According to one aspect of the present invention, in a digital switching circuit having a different stable state to represent each digit value and in which each stable state is defined by the conductive condition of a number of transistors having respective control electrodes to one or more of which a switching signal is applied to determine the stable state of the circuit, said control electrodes are interconnected by circuit means which limit their potential difference when no change of state of the circuit occurs in a succession of applications of said switching signal.

According to another aspect of the invention, in a two-state circuit comprising two transistors having main conduction paths the currents through which in operation are mutually complementary, the two states corresponding to predominant conduction by the two paths respectively, and in which each transistor has a control electrode to a selected one of which a switching signal is applied to determine the state of the circuit, said control electrodes are interconnected by circuit means which limit their potential difference when no change of state of the circuit occurs in a succession of applications of said switching signal.

The circuit may comprise two transistors connected as a bistable circuit and having base control electrodes which are directly interconnected by two semiconductor diodes in parallel and oppositely directed.

Alternatively the circuit may comprise two transistors connected as a bistable circuit and having base control electrodes which are directly interconnected by a resistor.

A shift register may comprise a plurality of stages, each comprising a switching circuit as aforesaid, the stages being interconnected so as to cycle a digital pattern which includes a succession of the same digit, the current switched in each stage at the state change consequent upon the termination of said succession being limited by the presence of said circuit means, so permitting faster operation.

A timing pulse generator for a P.C.M. system and employing switching circuits in accordance with the invention, will now be described, by way of example, with reference to the accompanying drawings of which:

The timing generator is required to accept a received signal having a frequency of up to 130 mc./s. which is sufficient to accommodate a 6 mc./s. television video signal in a single channel containing a nine-bit code. The output signal of the generator is required to be a pulse in one or more selected time slots of the nine and this signal or signals is used for synchronizing purposes.

Figure 1:
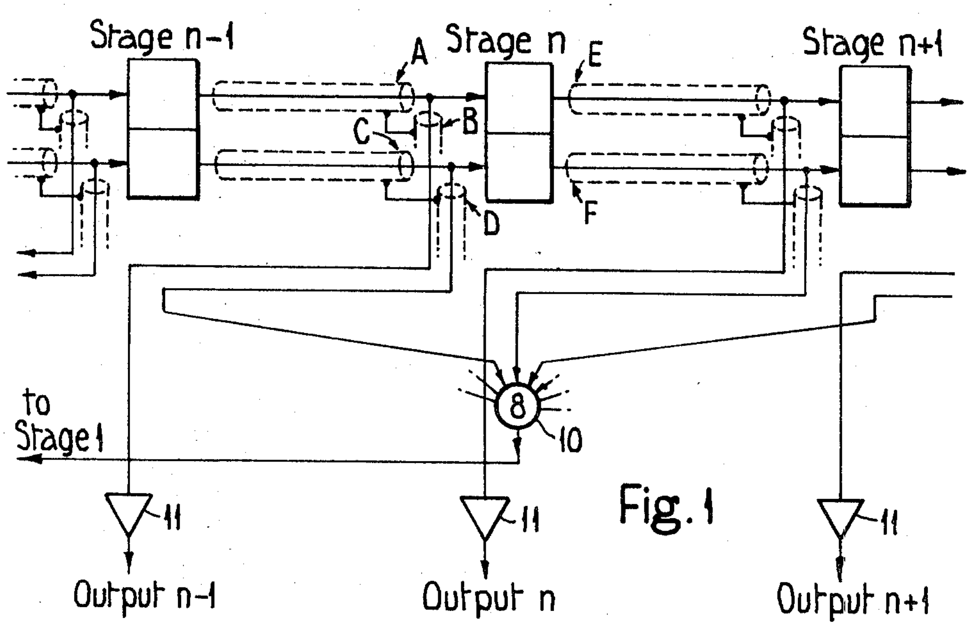
FIG. 1 is a schematic diagram of several stages of a cyclic shift register.

Referring to FIG. 1 a shift register with feedback is used as the timing generator. The register has nine binary stages, several of which are shown referenced ($n$—1), $n$, ($n$+1). From each of the first eight of these binary stages an output signal is taken to one of eight inputs of an eight input NAND gate 10. The output signal from this gate 10 is applied to a steering input of the first stage (not shown) with the result that when a '1'-state occurs in the ninth stage and a '0' in all of the others the next stepping pulse causes the first stage to adopt the '1'-state and all of the others the '0'-state. A '1' is thus stepped through the register, each stage providing a cyclic output signal comprising one pulse and eight spaces. The signals from the successive stages are therefore phase displaced so that a nine digit cycle having any desired phase (of the nine) is provided.

The stepping signal for the shift register is provided by a generator (not shown) operating at the basic digit rate and triggered by the received signal.

Figure 2:
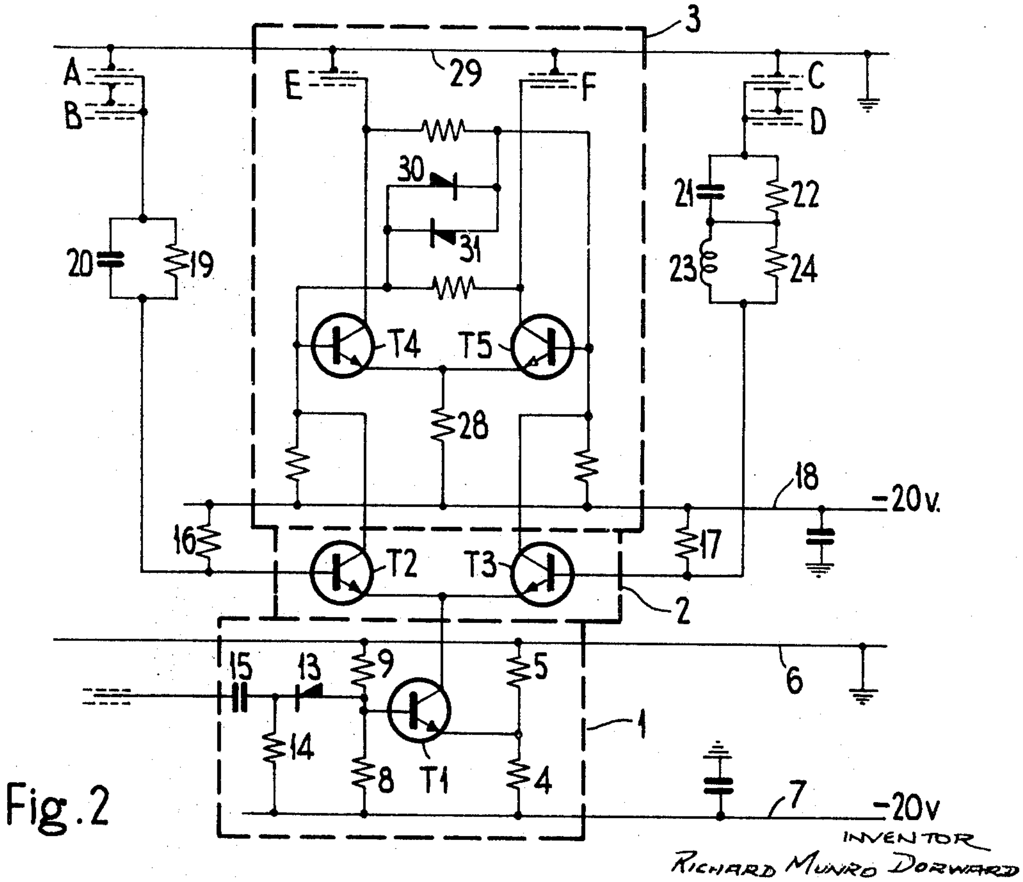
FIG. 2 is a circuit diagram of a bistable circuit constituting one stage of the register.

Each stage, such as stage $n$ shown in FIG. 2, of the shift register comprises a current-pulse generator 1, a current-steering transistor circuit 2 and bistable circuitry 3. The current-pulse generator 1 is required to generate pulses suitable for switching transistors of the bistable circuit 3. An NPN transistor T1 has its emitter connected to the junction of two resistors 4 and 5 of values 50 ohms and 1.2 k ohms these being connected in that order between —20 and 0 volt lines 7 and 6.

The base of transistor T1 is also connected to the junction of two resistors 8 and 9 of values 220 ohms and 1.5 k ohms respectively connected between lines 6 and 7, so that without further circuitry the transistor T1 is 'on' to the extent determined by the base and emitter resistors 4, 5, 8 and 9. Also connected to the base of transistor T1 is a rectifier diode 13 in series with a resistor 14 which is connected to the negative line 7. The diode is directed so as normally to draw current through the resistors 9 and 14 with which it is in series and thus lower the potential of the base of transistor T1 and cut off the transistor.

A drive or stepping input signal is applied to the cathode of rectifier diode 13 by way of a capacitor 15, the drive signal being a sinusoidal signal having the digit-rate frequency extracted from the received P.C.M. signal. At each positive going pulse of the drive signal the rectifier diode 13 is reverse biased and a pulse of collector current occurs, of amplitude determined by the base and emitter resistors mentioned above.

The steering circuit 2, mentioned above, comprises two NPN transistors T2 and T3 whose emitters are commoned and connected to the collector of the current generator transistor T1. The bases of these transistors T2 and T3 are connected by resistors 16 and 17 to a —20 volt line 18.

The base of transistor T2 is connected by means of a parallel R C circuit 19/20 to an intermediate point on the inner conductor of a coaxial line which supplies one of two output signals form the preceding stage $n$—1 (on section A) to an output amplifier 11 (on section B) from which amplifier one of the nine final output signals is derived. This output amplifier 11 provides the DC termination of the coaxial line necessary for the completion of the collector path of a transistor (corresponding to transistor T4 to be described) in the preceding stage bistable circuit. The coaxial line interconnections are shown in FIG. 1.

The resistor 19 in conjunction with resistor 16 prevents the base of transistor T2 from becoming positive with respect to its collector, and therefore prevents saturation. Capacitor 20 presents a virtual short circuit at the frequency of operation and prevents attenuation of the *h.f.* pulse components otherwise caused by the potential divider effect of the resistors 16 and 19. The base of the above steering transistor T2 provides a substantial parallel capacitance loading on the preceding stage and this is separated from the preceding stage by the coaxial line section A. This delayed application of capacitance loading is the subject of U.S. Pat. application Ser. No. 758,424 filed on 9th Sept. 1968 in the U.S. Patent Office in the name of Richard Munro Dorward.

The second steering transistor T3 has its base connected to an intermediate point on the inner conductor of a coaxial line C—D by way of a resistor/capacitor parallel combination 21/22 (having the same purpose as the corresponding combination 19/20 supplying transistor T2), in series with an inductor/resistor parallel combination 23/24. The coaxial line supplies the other output signal from the preceding stage (on section C) to the eight input NAND gate 10 (on section D). Again there is a delayed application (by way of section C) of parallel capacitance loading (the base of steering transistor T3) to the preceding stage. The additional inductor 23 in the base connection of transistor T3 provides further isolation of the capacitance load thus reducing the residual degradation of the waveform applied to the NAND gate, which, in contrast to the output amplifier 11, is in the feedback loop of the register.

The bistable circuit 3 referred to above is based on a current switching transistor pair as is the steering circuit 2. Two switching transistors T4 and T5 have their emitters connected directly together and to the negative line 18 by way of a 560 ohm resistor 28. The collectors are respectively connected to the 'inners' of two coaxial lines E and F the outer conductors of which are connected to an earth line 29. The ends of these coaxial lines remote from those shown are connected to the respective steering inputs of the following stage. The coaxial lines E and F thus constitute the coaxial lines A and C of the following stage, and the DC paths for the collectors of the transistors T4 and T5 are respectively completed in the output amplifier 11 of the following stage and in the NAND gate 10, by way of coaxial lines B and D of the following stage. Each collector is cross coupled to the other base by a 1 k ohm resistor, the bases being connected to the negative line 18 by respective 4.7 k ohm resistors.

The steering transistor collectors are then connected to the respective bases of the switching transistors T4 and T5.

Between the bases of the switching transistors T4 and T5 are connected two semiconductor diodes 30 and 31 in parallel and oppositely directed.

The present register stage is based upon current switching techniques. These involve, in this case, nonsaturation of the switching transistors T4 and T5, achieved by selection of the base and emitter bias resistors. The effect of this nonsaturation is that there is no excess charge to remove from the collector region of the transistors on switching—which would retard the switching operation. Again, by switching a limited current the voltage change necessary to effect this is correspondingly limited with the result that smaller charges are acquired by stray capacitance which charges are therefore more quickly removed on switching. A feature of this bistable circuit is that the cross coupling is only required to maintain bistability and not effect any switching. The emitter coupling means that 'drive' to one base of the switching transistors effects switching of both of them.

In use, the nine stages of the shift register are driven by simultaneous sinusoidal signals supplied on coaxial lines to the individual current pulse generators 1. In an individual stage the drive pulse is steered by the steering transistors T2, T3 to the base of one of the switching transistors T4, T5. The current thus extracted from this base turns off the transistor (assuming it was previously on) the emitter coupling then causing the turn-on of the other transistor. The collectors of the switching transistors 'see' a purely resistive load for the brief period between onset of the switching pulse and its reflection due to the mismatch termination of the coaxial lines E and F. The current switching is thus unhindered by the parallel capacitive loading of the steering transistors of the next stage. The base bias on the steering transistors of this next stage is determined by the state of the previous stage thus providing the usual pattern-shifting effect of a shift register.

In operation as a timing pulse generator of a P.C.M. system the shift register is required to cycle a pattern comprising a '1' and eight '0's.' Such a succession of the same digit ('0') causes each stage to be subjected to eight successive driving pulses to the same switching transistor. Each driving pulse, as steered by the appropriate steering transistor T2 or T3, exceeds the minimum amplitude necessary for switching in order to speed up the switching. Stray capacitance of the base of the driven switching transistor accumulates charge from the successive (nonswitching) drive pulses and lowers the base potential correspondingly. The base potential of the switching transistor which is left 'on' slowly returns to the positive level of its DC condition. When eventually a drive pulse is steered to the 'on' switching transistor a comparatively large potential change would have to be overcome before switching could occur. This disadvantage is overcome in the present embodiment according to the invention by the rectifier diodes 30 and 31 previously referred to and which are connected between the bases of the switching transistors T4 and T5.

The two diodes 30, 31 ensure that once a switching transistor has been switched off, one of the diodes conducts and any further drive current is drawn from both sides of the bistable. At the same time they ensure that the voltage between the bases cannot exceed about 0.7 volts. At high frequencies the DC level of the switching transistor bases is reduced but a difference of 0.7 volts is maintained which is large enough to maintain bistability but small enough to prevent waste of drive current before switching occurs. The diodes 30, 31 must be high speed diodes, S.G.S. Fairchild BAY 82 being used in this embodiment. The sinusoidal drive signal applied to the current pulse generator 1 of each stage is satisfactory for frequencies above 100 mc./s. but below this a pulse drive signal is necessary because a 'squared-up' sine wave would provide too wide a drive pulse.

Generally it would not be necessary to produce all nine timing pulse output signals and certain ones of the output amplifiers 11 would then be omitted.

In a modification of the bistable circuit described above, the switching transistors T4 and T5 are of opposite type (that is PNP) to the steering transistors T2 and T3 and this arrangement inherently prevents the saturation of the steering transistors and obviates the potential divider resistors 19 and 22 and their associated circuitry.

I claim:

1. A bistable circuit having independent steering and driving inputs and comprising:

A. two transistors having
 i. emitter, base and collector electrodes,

B. a first potential source terminal,

C. circuit means connecting each collector electrode to said first potential source terminal, D. resistive circuit means connecting each collector electrode to the base electrode of the other transistor, E. circuit means directly connecting the emitter electrodes to one another, F. a second potential source terminal, G. a common emitter resistor connected between said emitter electrodes and said second potential source terminal, H. a respective bias circuit connected to each base electrode and cooperating with said common emitter resistor for limiting the conducting state of each transistor to a nonsaturated condition, I. a current pulse generator for producing drive pulses of limited magnitude, J. a steering circuit connected to said current-pulse generator for receiving said drive pulses and being responsive to a steering signal to steer a received drive pulse to one or the other of two outputs in dependence upon said steering signal, K. circuit means connecting said two outputs to said base electrodes respectively to supply a drive pulse for establishing a predetermined conduction state of the associated transistor, and L. two semiconductor diodes connected in parallel and in opposite directions between said base electrodes for limiting the differential accumulation of charge on said two base electrodes when a plurality of successive drive pulses are steered to the same transistor.

2. A shift register comprising a plurality of stages each comprising a bistable circuit according to claim 1, the stages being interconnected so as to cycle a digital pattern which includes a succession of the same digit thus causing a said plurality of drive pulses to be steered to the same transistor in any stage.